(No Model.)
E. JUNGENFELD & H. RASSBACH.
STOP COCK FOR AMMONIA GAS.
No. 332,345. Patented Dec. 15, 1885.
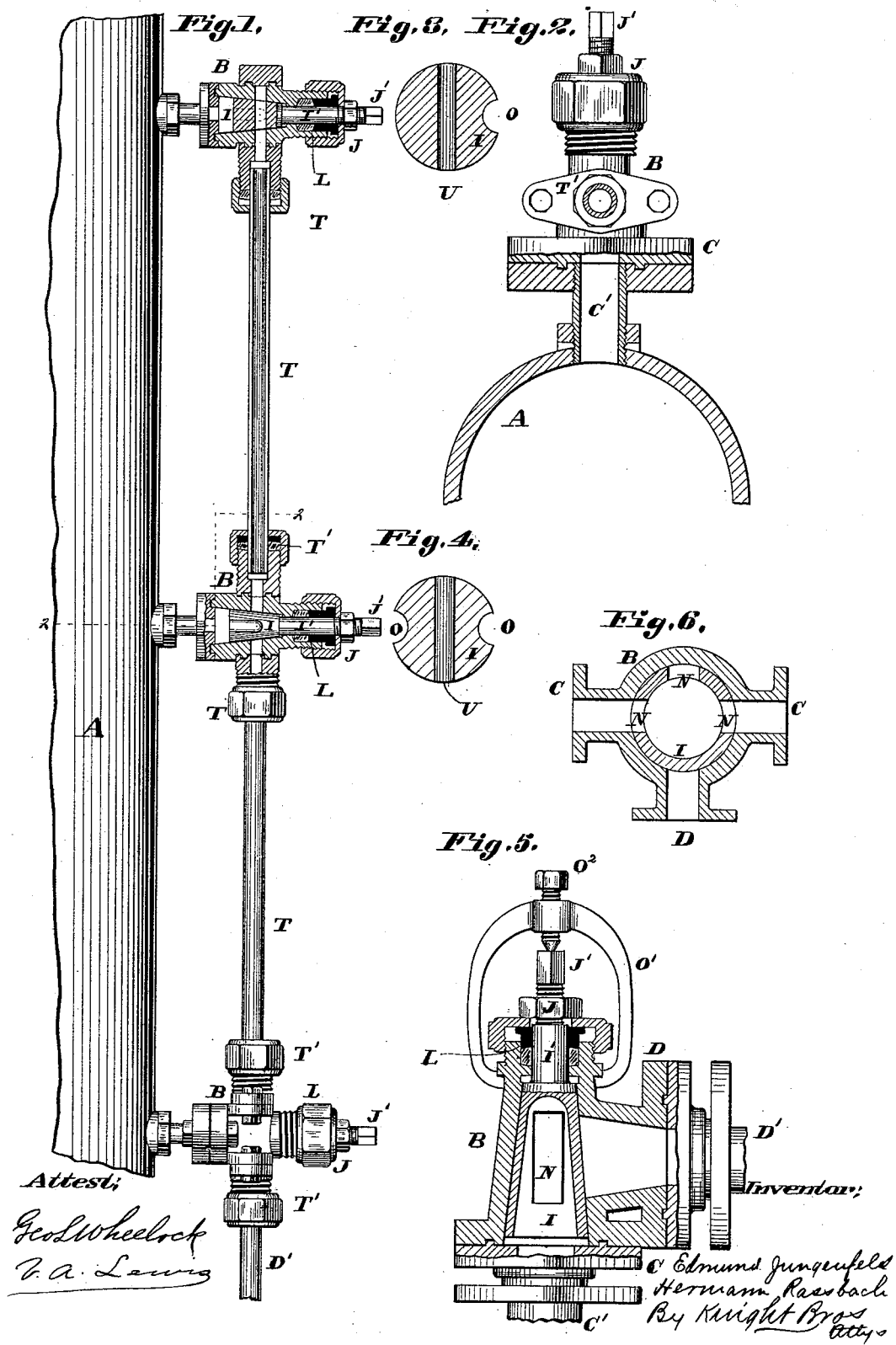

UNITED STATES PATENT OFFICE.

EDMUND JUNGENFELD AND HERMANN RASSBACH, OF ST. LOUIS, MISSOURI, ASSIGNORS TO THE EMPIRE REFRIGERATING COMPANY, OF SAME PLACE.

STOP-COCK FOR AMMONIA-GAS.

SPECIFICATION forming part of Letters Patent No. 332,345, dated December 15, 1885.

Application filed November 17, 1884. Serial No. 148,189. (No model.)

*To all whom it may concern:*

Be it known that we, EDMUND JUNGENFELD and HERMANN RASSBACH, of the city of St. Louis, in the State of Missouri, have invented a certain new and useful Improvement in Stop-Cocks for Ammonia-Gas, of which the following is a full, clear, and exact description, reference being had to the accompanying drawings, forming part of this specification, and in which—

Figure 1 is part in side view and part in vertical section, three cocks being shown on a vessel. Fig. 2 is part in side view and part in vertical section, the section being taken on line 2 2, Fig. 1. Fig. 3 is an enlarged vertical section of one of the cocks and a side view of a device for loosening the cock. Figs. 4, 5, and 6 illustrate modifications.

Our invention relates to certain improvements in cocks for use more particularly in ammonia-gas systems; and our invention consists in features of novelty hereinafter fully described, and pointed out in the claims.

Referring to the drawings, A represents part of a vessel to which the cocks may be connected, as shown in Figs. 1 and 2.

B represents a barrel provided with flanges C D for connection with pipes C' and D'; or it may have still another flange, as shown in Fig. 6, for connecting with a third pipe when desired. Within the barrel is a tapering plug, I, provided with a stem or neck, I', the upper part of which is screw-threaded to receive a nut, J, and the extreme upper end of which may be made square, as shown at J', to receive a wrench. Surrounding the lower part of the stem or neck is a stuffing-box, L, to insure a gas-tight joint. The plug may be made hollow, as shown in Figs. 3 and 6, to permit the passage of the gas through openings N into the pipe or pipes when the cock is opened; or they may be made solid with one or two side grooves, O, (see Figs. 3 and 4,) for the passage of gas to the pipe or pipes when the cocks are opened.

The gas-pressure tends to tighten the tapering plug in the barrel, which may also be done by means of the nut J, and by loosening the nut the plug may, if desired, be loosened in the barrel by means of a yoke, O', engaging beneath a flange or collar on the barrel, and provided with a set-screw, O², that jams against the upper end of the stem of the plug. (See Fig. 3.)

Where a number of cocks are used together, they may be connected by glass gage-pipes T, (see Fig. 1,) provided with stuffing-boxes T', and the plugs may have transverse ports or openings U, which will be in line with these pipes when the cocks are open, so that the gas may pass through to the main discharge-pipe D'.

We claim as our invention—

1. The combination, with a barrel having a hollow tapering bore, a port in the base thereof, and a second port in the side, of a hollow tapering plug open at its base and side for communicating with said ports, respectively, and a screw bearing against the smaller end of the said plug in opposition to the steam-pressure, substantially as and for the purpose set forth.

2. The combination of the barrel B, having a tapering bore, the tapering plug I, pressed to its seat within said barrel by the fluid, the stem I', projecting from the smaller end of said plug, the yoke O', engaging a flange on the barrel, and the screw O², threaded into the yoke O' and bearing upon the stem I' in opposition to the pressure of the fluid, as and for the purposes set forth.

EDMUND JUNGENFELD.
HERMANN RASSBACH.

In presence of—
GEO. H. KNIGHT,
SAML. KNIGHT.